W. L. DECKER.
STAY BOLT AND MEANS FOR SCREWING THE SAME IN PLACE.
APPLICATION FILED FEB. 10, 1912.
1,041,440. Patented Oct. 15, 1912.
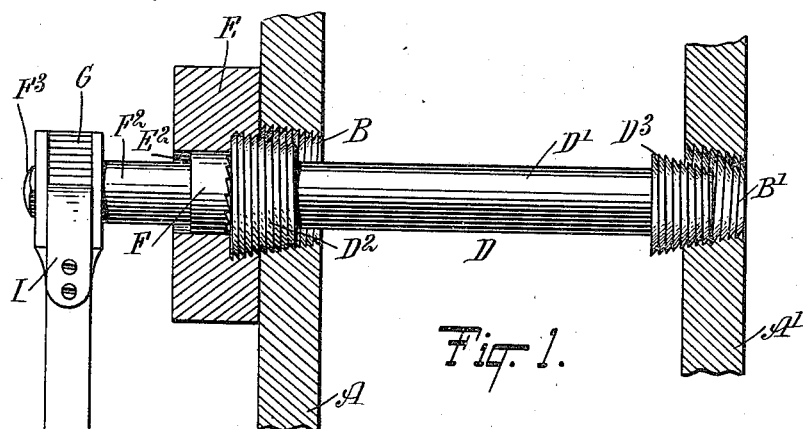
Fig. 1.
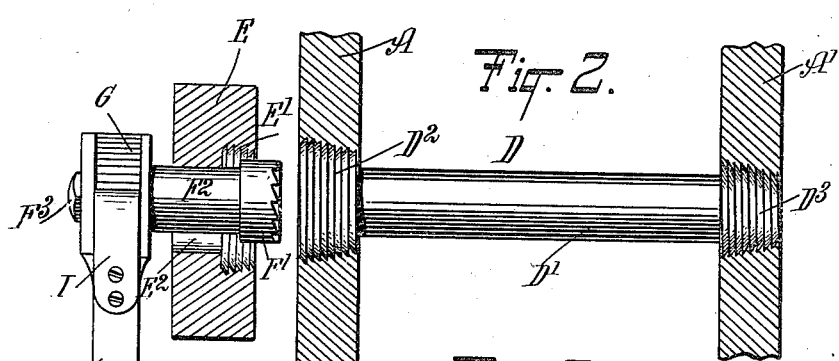
Fig. 2.
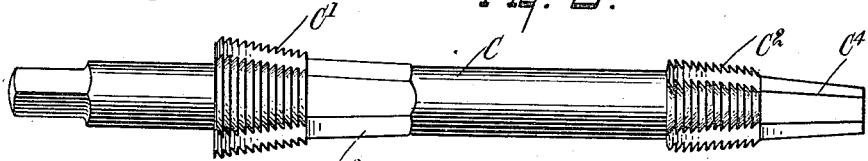
Fig. 3.
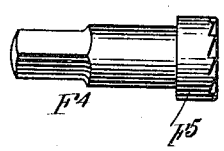  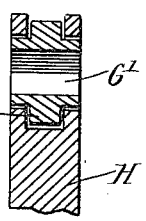
Fig. 4. Fig. 5. Fig. 8.
Fig. 6.
Fig. 7.
WITNESSES
George Bamlay
Rev. J. Hooker
INVENTOR
William Lorenzo Decker
BY Munn & Co.
ATTORNEYS

UNITED STATES PATENT OFFICE.

WILLIAM LORENZO DECKER, OF MOLLENDO, PERU.

STAY-BOLT AND MEANS FOR SCREWING THE SAME IN PLACE.

1,041,440.　　　　Specification of Letters Patent.　　Patented Oct. 15, 1912.

Application filed February 10, 1912. Serial No. 676,737.

*To all whom it may concern:*

Be it known that I, WILLIAM LORENZO DECKER, a citizen of the United States, and a resident of Mollendo, Peru, South America, have invented a new and Improved Stay-Bolt and Means for Screwing the Same in Place, of which the following is a full, clear, and exact description.

The invention relates to boilers, and its object is to provide a new and improved stay bolt and means for screwing the same in position with a view to rigidly connect the inner and outer walls of the boiler with each other and thus prevent the walls from bulging under pressure, and to permit of conveniently and quickly screwing the stay bolt in place or removing the same when necessary.

For the purpose mentioned, use is made of a stay bolt provided at its ends with conical threads adapted to be screwed into tapped holes in the inner and outer walls of the boiler, the threads being either right-hand or left-hand, and each thread has a straight base and a slanting back, the backs of the threads at one end of the stay bolt slanting in opposite directions to the backs of the threads at the other end of the stay bolt. Use is also made of a guide nut for engagement with one threaded end of the said bolt, a driving key mounted to turn in the said guide nut and having a gripping face adapted to engage the end of the stay bolt, and manually-controlled means for turning the said key with a view to turn the stay bolt and thus secure the latter in place.

A practical embodiment of the invention is represented in the accompanying drawings forming a part of this specification, in which similar characters of reference indicate corresponding parts in all the views.

Figure 1 is a side elevation of the stay bolt partly in position on the inner and outer walls of the boiler, the boiler walls and guide nut being shown in section; Fig. 2 is a like view of the same showing the stay bolt in place and the driving means detached; Fig. 3 is a side elevation of the reamer and tap for reaming and threading the bolt holes in the inner and outer walls of the boiler; Fig. 4 is a side elevation of the driving key for screwing a stay bolt in position; Fig. 5 is a face view of the same; Fig. 6 is a side elevation of the driving key for unscrewing a stay bolt; Fig. 7 is a face view of the same; and Fig. 8 is a cross section of the ratchet lever.

The inner and outer walls A and A' of a boiler are provided with oppositely-disposed threaded or tapped holes B, B' formed by the use of a reaming and tapping tool C provided with spaced threads C', C² and reamers C³, C⁴ adjacent the said threads C', C², so that when this tool is placed in position in the bolt holes of the inner and outer walls A and A' and turned then the said bolt holes are reamed and tapped to provide the conical threads B, B' previously mentioned.

The stay bolt D consists of a shank D' provided at its ends with threads D², D³ adapted to screw into the threaded holes B and B' to effectively connect the walls A and A' with each other. The threads D² and D³ are either right-hand or left-hand and of the same pitch, and each thread has a straight base and a slanting back, the threads D², D³ having their backs, however, slanting in opposite directions, as plainly indicated in Figs. 1 and 2; the threads C' and C² of the reamer C being correspondingly shaped and arranged to form corresponding threads B, B' in the walls A, A' of the boiler.

By arranging the threads B, B' and D², D³ in the manner described and shown the threads D² and D³ pull against each other on screwing the stay bolt D in place, thereby drawing the stay bolt perfectly tight in position with a view to prevent leakage of either steam or water.

In practice the stay bolt D is preferably screwed in place from the inside of the boiler or fire box, and no riveting or calking whatever is required as far as the stay bolt is concerned, and the stay bolt can be readily screwed in place or screwed out whenever it is desired to do so. In order to permit of conveniently screwing the stay bolt D in position, the inner or base end of the thread D³ is somewhat less in diameter than the inner or apex end of the thread D² to permit of conveniently passing the thread D³ of the stay bolt D through the hole B to finally engage the threaded hole B'. It will also be noticed that by making the threads D² and D³ conical an exceedingly strong hold is had of the stay bolt D on the walls A and A'.

In order to screw the said stay bolt in position use is made of the following means: A guide nut E is provided with a screw thread E' and a smooth guide opening $E^2$ concentric with the thread E', which latter is adapted to screw on the outer or base end of the thread $D^2$ of the stay bolt D, as plainly indicated in Fig. 1. A key F having a head F' is employed for turning the stay bolt D to final position, the said head F' being mounted to turn in an opening $E^2$ and having on its face gripping teeth adapted to engage the outer end of the stay bolt D. The key F is provided with a shank $F^2$ terminating in a polygonal end $F^3$ adapted to engage a correspondingly-shaped opening or bore G' formed in a ratchet wheel G mounted to turn in suitable bearings arranged in a lever H carrying a pawl I engaging the teeth of the ratchet wheel G so as to turn the same on imparting a swinging motion in one direction to the lever H.

In using the device, the stay bolt D is partly placed in position on the walls A and A', as indicated in Fig. 1, and then the nut E is screwed on the outer portion of the thread $D^2$ so that the inner face of the nut E abuts against the outer face of the boiler wall A. The driving key F is now placed in position in the nut E so that the gripping face of the head F' engages the outer end of the stay bolt D, and then the operator turns the lever H so as to impart intermittent turning motion to the key F with a view to turn the stay bolt D so as to screw the same home in the walls A and A', the stay bolt D during this operation unscrewing in the nut E. When it is desired to unscrew a stay bolt for one reason or another, use is made of a driving key $F^4$ having a head $F^5$ provided on its face with gripping teeth extending in an opposite direction from the teeth of the gripping head F', and in using this key $F^4$ it is turned in an opposite direction by the ratchet lever H to unscrew the bolt D from the walls A and A'.

From the foregoing it will be seen that by the arrangement described, the stay bolt D can be readily screwed in position on the walls A and A' of the boiler, or unscrewed therefrom, and when the stay bolt is screwed in place it rigidly connects the walls A and A' with each other to prevent bulging of the same when the boiler is in use.

Having thus described my invention, I claim as new and desire to secure by Letters Patent:

1. A stay bolt, comprising a shank and a set of conical threads at each end of the shank, each thread having a straight base and a slanting back, the backs of the threads at one end of the stay bolt slanting in an opposite direction to the backs of the threads on the other end of the stay bolt, the inner ends of the threaded portions of the stay bolt being of greater diameter than the shank portion of said bolt.

2. In combination with a stay bolt having threads at the ends for screwing into tapped holes in the inner and outer boiler walls, a guide nut screwing on the threads at one end of the stay bolt, and a driving key mounted to turn in the said guide nut and adapted to engage the end of the stay bolt to turn the latter.

3. In combination with a stay bolt having a set of threads at each end, a guide nut having a screw thread adapted to screw on the outer end of one of said sets of threads, the guide nut having a smooth guide opening concentric with the thread, and a driving key having a head mounted to turn in the said guide opening in the nut, the face of the said head being provided with gripping teeth for engaging the outer end of the stay bolt.

4. In combination with a stay bolt having threads at the ends for screwing into tapped holes in the inner and outer boiler walls, a guide nut screwing on one of the said threads, a driving key mounted to turn in the said guide nut and adapted to engage the stay bolt to turn the same, and means for turning the said driving key.

5. In combination with a stay bolt having threads at the ends for screwing into tapped holes in the inner and outer boiler walls, a guide nut screwing on one of the said threads, a driving key mounted to turn in the said guide nut and having a head and a shank, the head being provided at its face with gripping teeth for engagement with the end of the stay bolt, and means for turning the driving key.

In testimony whereof I have signed my name to this specification in the presence of two subscribing witnesses.

WILLIAM LORENZO DECKER.

Witnesses:
V. HERRERA VARGA,
S. F. MENDEZ.